United States Patent [19]

Bratset

[11] Patent Number: 5,050,825
[45] Date of Patent: Sep. 24, 1991

[54] PORTABLE AND COLLAPSIBLE SUPPORT FOR PLASTIC GROCERY BAGS

[76] Inventor: David A. Bratset, 6135 E. Joan de Arc, Scottsdale, Ariz. 85254

[21] Appl. No.: 542,965

[22] Filed: Jun. 25, 1990

[51] Int. Cl.⁵ .............................................. A63B 55/04
[52] U.S. Cl. ........................................ 248/97; 248/146
[58] Field of Search ..................... 248/95, 97, 99, 100, 248/146, 150, 152; 224/42.42, 273; 383/33; 211/13; 141/316, 390, 391; 53/390

[56] References Cited

U.S. PATENT DOCUMENTS

| | | | |
|---|---|---|---|
| 3,737,129 | 6/1973 | Foster | 248/150 X |
| 4,189,056 | 2/1980 | Majewski | 211/195 |
| 4,226,348 | 10/1980 | Dottor | 224/42.42 |
| 4,305,519 | 12/1981 | Gerich | 220/7 |
| 4,366,916 | 1/1983 | Guido | 248/97 |
| 4,372,512 | 2/1983 | Wolfe | 248/97 |
| 4,407,474 | 10/1983 | Swenson | 248/97 |
| 4,458,867 | 7/1984 | Malik | 248/97 |
| 4,543,084 | 9/1985 | Bailey | 248/97 |
| 4,579,307 | 4/1986 | Malik | 248/99 |
| 4,623,111 | 11/1986 | Prader | 248/97 |
| 4,684,087 | 8/1987 | Spickard | 248/150 |
| 4,723,742 | 2/1988 | Krauss | 383/33 X |
| 4,746,041 | 5/1988 | Cook et al. | 224/42 |
| 4,881,706 | 11/1989 | Sedlk | 248/99 |
| 4,893,862 | 1/1990 | Hollenbaugh | 224/42.42 X |
| 4,921,197 | 5/1990 | Benoit | 248/97 |

Primary Examiner—J. Franklin Foss
Attorney, Agent, or Firm—Cahill, Sutton & Thomas

[57] ABSTRACT

A plastic grocery bag support having a base and an upright member, the base and upright members being releasably attached each to the other for the purpose of supporting a plurality of filled plastic grocery bags in a substantially vertical position. The plastic grocery bags are supported on the assembly by means of their integral handles being looped over a shaped upper portion of the upright member. The grocery bags are thereby held in an upright position during transportation thereof. When the upright member is joined to the base member the upright member is held in a position which allows it to have a "zig-zag" horizontal cross section which provides a stiffening characteristic to the complete assembly. Upon release of the upright member from the base member, the two members may be stored in a flat condition in a minimum amount of storage space; the upright member being bendable along a plurality of vertical hinge lines which are formed as an integral part thereof.

4 Claims, 2 Drawing Sheets

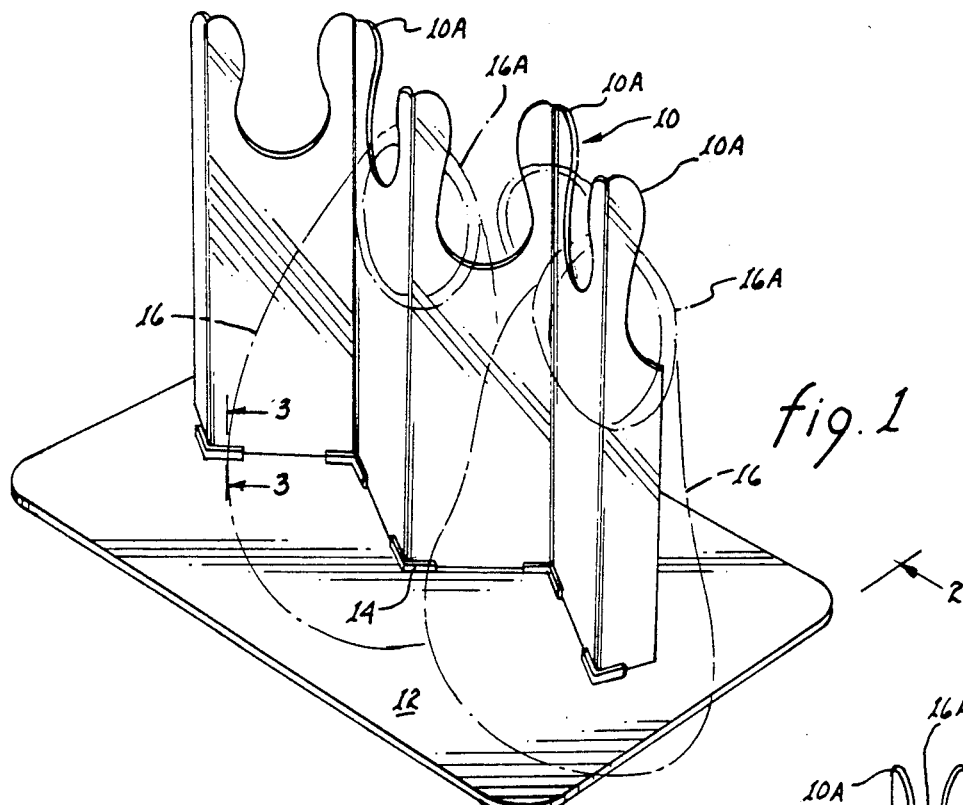
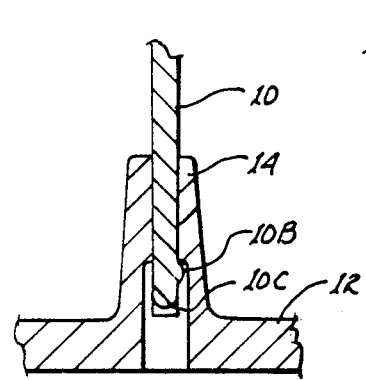
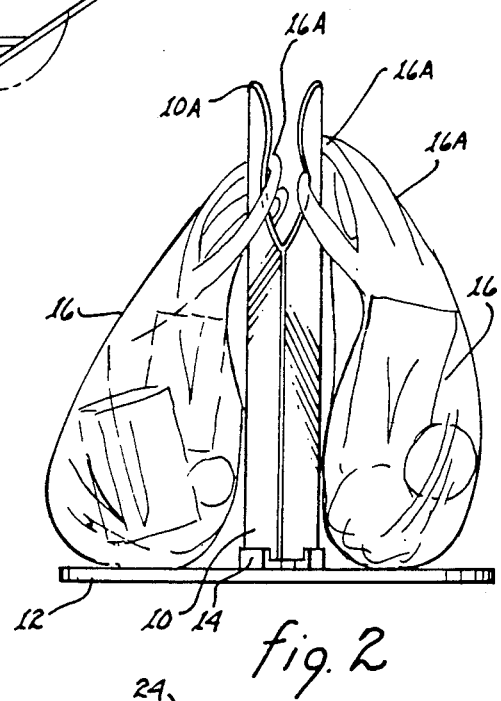
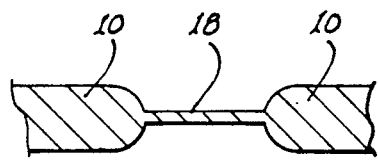
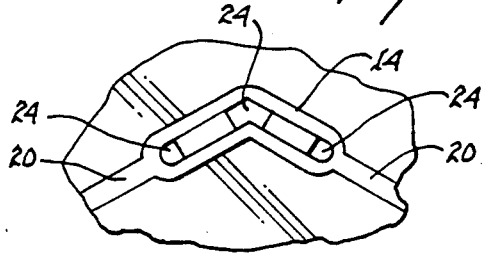

PORTABLE AND COLLAPSIBLE SUPPORT FOR PLASTIC GROCERY BAGS

FIELD OF THE INVENTION

The invention relates to a portable and collapsible assembly for holding filled plastic grocery bags upright during transportation thereof.

BACKGROUND OF THE INVENTION

The advent of the use of plastic grocery bags with integral loop type handles has created handling problems; both in the retail stores on the part of clerks and "baggers" and on the part of consumers. The in-store problems have been alleviated by means of the use of newly designed and installed holding fixtures, generally supporting the bag by its integral loop type handle in a location accessible to the check out counter and its clerk. Such devices are typified by U.S. Pat. No. 4,623,111 issued to R.D. Prader on Nov. 18, 1986, for a Wire Holder for Handled Plastic Bags; and U.S. Pat. No. 4,458,867 issued to J.J. Malik on July 10, 1984 for a Wire Rack Bag Holding Device. U.S. Pat. No. 4,579,307 was also issued to J.J. Malik on Apr. 1, 1986, for a Wire Rack for Plastic Bag.

All of these patents appear to disclose wire racks which may be fastened or installed in a fixed location and each of them would appear to resolve the handling problems within a place of business where such bags are initially loaded with goods. However, a new problem must be faced when a consumer must transport the filled bag to an ultimate destination. If such loaded or filled bags are placed in the trunk of an automobile, on the floor of a station wagon or in a pickup truck bed, the bag tends to collapse and spill its contents. While the basic problem also applies to the older more conventional paper grocery bags, the paper bags are inherently stiffer and do not demonstrate the problem to the same extent as the more recently introduced loop handled plastic bags. However, the problem was present with the older style paper bags and U.S. Pat. Nos. 4,189,056 issued to E.J. Majewski on Feb. 19, 1980 for a Knock-Down Portable Shopping Rack; U.S. Pat. No. 4,226,348 issued to F.A. Dutter et al. on Oct. 7, 1980, for an Automobile Trunk Contained Grocery Bag Holder; U.S. Pat. No. 4,305,519 issued to G. Gerich on Dec. 15, 1981 for a Collapsible Holder for Grocery Bags; U.S. Pat. No. 4,372,512 issued to W.R. Wolfe on Feb. 8, 1983 for a Bag Supporting Apparatus; and U.S. Pat. No. 4,746,041 issued to L.R. Cooke et al. on May 24, 1988, for an All Purpose Convertible Rack all represent efforts to resolve the problem with respect to transportation of paper filled bags. However, none of these inventions are adaptable for use with the newer plastic bags fitted with integral loop handles.

SUMMARY OF THE INVENTION

These and other shortcomings of the present art are overcome by the instant invention wherein a plastic grocery bag support is fabricated of plastic or other suitable materials and comprises a base member for providing a stable support for the assembly of the invention, and an upright member for providing means for holding upper portions of the plastic grocery bag in place. The upright member is equipped with lower end tabs which are engaged in protruding sockets in the base member. The protruding sockets or mounting receptacles are arranged so that the upright member has a horizontal cross section comprising a "zig-zag" configuration to provide a degree of stiffness in the assembly which would otherwise not be available.

It is, therefore, an object of the invention to provide support means for filled plastic grocery bags of the type which have loop-like carrying handles incorporated into an upper section thereof.

It is another object of the invention to provide a light weight, portable support assembly for convenient transportation of filled plastic grocery bags.

It is still another object of the invention to provide a stable, light weight, portable support assembly for convenient transportation of filled plastic grocery bags, the assembly being collapsible and separable into a plurality of portions for ready storage thereof when not in use.

BRIEF DESCRIPTION OF THE DRAWINGS OF THE INVENTION

These and other objects of the invention will be better understood upon study of the Detailed Description of the Preferred Embodiment of the Invention together with the drawings in which:

FIG. 1 is a perspective view of the assembled invention as it would be configured for use;

FIG. 2 is an end view of the invention of FIG. 1, taken from 2—2 and shown with two filled grocery bags attached thereto;

FIG. 3 is a detailed cross sectional view of the invention of FIG. 1, taken from 3—3 of FIG. 1;

FIG. 5 is a cross sectional view of the upright portion of the invention taken from 5—5 of FIG. 4 and showing the reduced cross section which comprises a hinge;

FIG. 9 is a detailed top view of the mounting receptacle of FIG. 7 taken from 9—9 of FIG. 7.

Figure 4:
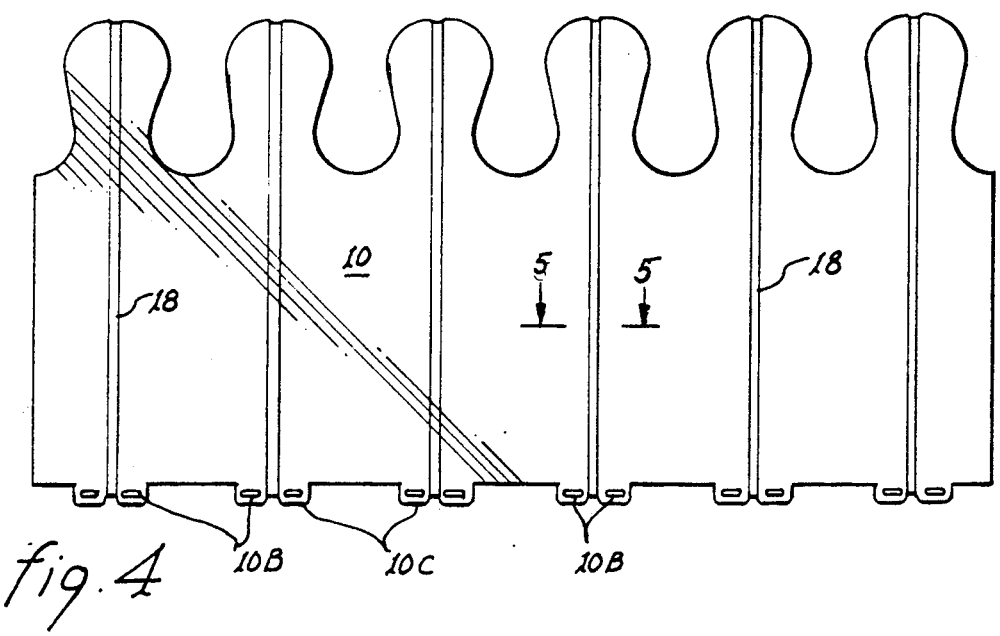
FIG. 4 is a side view of the upright portion of the invention of FIG. 1, shown in a flattened state.

DETAILED DESCRIPTION OF THE PREFERRED EMBODIMENT OF THE INVENTION (It should be noted that wherever in this specification like reference numerals are used they refer to like features of the invention. Wherever an alphabetic suffix is appended to such reference numerals, it indicates a portion of or a variation or different version of the same reference numeral which does not carry such suffix.)

In FIG. 1, it may be seen that the invention comprises two basic members; an upright member 10 and a base member 12. A number of hollow mounting receptacles 14, typically numbering five, as shown, are an integral molded part of base member 12. Alternatively, mounting receptacles 14 may be fabricated separately and adhered or otherwise fastened or attached to base member 12 in a suitable manner. Filled grocery bags 16 are shown in phantom as they would be supported by their handles 16A from an upper portion of upright member 10 at 10A. The upper portions are bowling pin-shaped with larger upper ends to facilitate the capture and retention of the flexible handles. Shaped upper portion 10A allows handles 16A of bag 16 to be looped over the upper extremities 10A of upright member 10, thus supporting grocery bags 16 in a upright position. The overall height of upright member 10 may be about 14 inches and the shaped cutout section may be about 5.5 inches deep in order to provide ready access for looped handles 16A of bags 16 and to properly support filled bags 16.

Upright member 10 and base member 12 may be fabricated of high density polyethylene (H.D.P.E.) or any other suitable material. In high quantity production it is anticipated that both members 10 and 12 would be injection molded.

An end view of the assembly of FIG. 1 is shown in FIG. 2 with grocery bags 16, in phantom, shown installed thereon. Base member 10 is typically 15 inches wide and 27 inches long, while upright member 12 is typically 14 inches high, as installed on and measured from the top of base 10. These dimensions have been shown to exhibit a satisfactory stability to the assembly for the purposes described herein.

FIG. 3 is a detailed cross sectional view of the mounting receptacle portion 14 of base 12 with upright member 10 mounted thereon. As may be seen, upright member 10 has a protruding "bump" 10B on one side of lower end tabs 10C, thereof. Tabs 10C are inserted into hollow portions of mounting receptacles 14 which form receptacles on base 12 for tabs 10C. Protruding tab 10C and bump 10B of upright member 10 captures member 10 in mounting receptacle 14 in a manner which locks upright member 10 to base 12. This arrangement permits disassembly by forcing upright member 10 upward and out of mounting receptacle 14, thereby overcoming the lock. Bump 10B may typically have a protruding dimension of about 0.025 inch and is radiused to approximately 0.060 inch for efficient locking and removal of upright member 10.

When upright member 10 is removed from base 12, it may be flattened at hinges 18, see FIG. 4. The detail of hinge 18 is more clearly shown in FIG. 5, a cross sectional view taken at 5—5 of FIG. 4. Hinge 18 is formed in vertical member 10 by reducing the thickness dimension of member 10, in the area where hinge action is desired, to about 0.015 inch over about a 0.20 inch width. The thinner material along hinge lines 18 makes it possible to readily straighten or bend member 10 at hinge lines 18, depending on whether it is to be stored for the next use or assembled with base 12, respectively.

Figure 6:
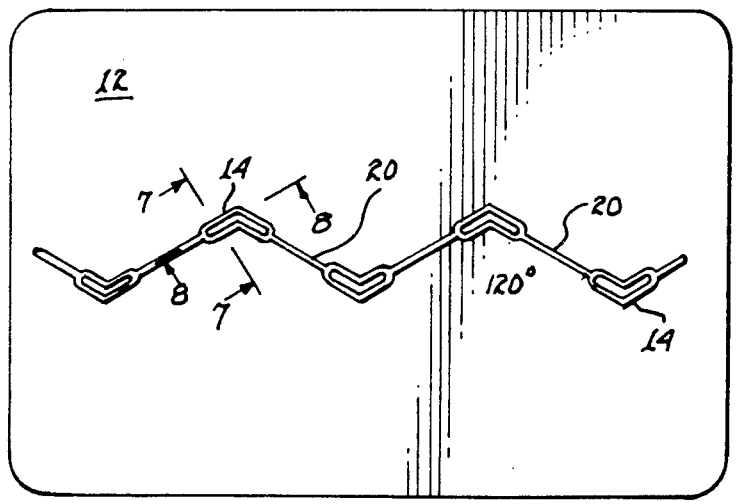
FIG. 6 is a top view of another embodiment of the base member of the invention of FIG. 1.

Of course, hinges 18 allow upright member 10 to be installed on base 12 in a manner which provides a "zigzag" configuration of upright member 10 in a horizontal plane, as shown in FIGS. 1, 2 and 6. This "zig-zag" configuration provides a degree of stiffness and stability to the assembly that would not be available were upright member 10 to be mounted in a flat or planar configuration. The particular angle used in the "zig-zag" configuration is determined by the design of mounting receptacles 14 on base 12. In a preferred embodiment of the invention, the angle built into mounting receptacles 14 is approximately 120 included degrees. That is, the angle between any two adjacent panels of upright member 10, as mounted on base 12, is approximately 120 degrees, as measured on the inside of the bend induced by mounting receptacles 14. Of course, it will be understood that a wide range of other angles may be employed for the same purpose.

FIG. 6 is a top view of another embodiment of the base member of the invention of FIG. 1. It incorporates ridge members 20 which are flush (in height) with and join mounting receptacles 14 for the purpose of stiffening base member 12. FIG. 6 also shows that the included angle between adjacent portions of each mounting receptacle 14 is approximately 120 degrees.

Figures 7, 8:
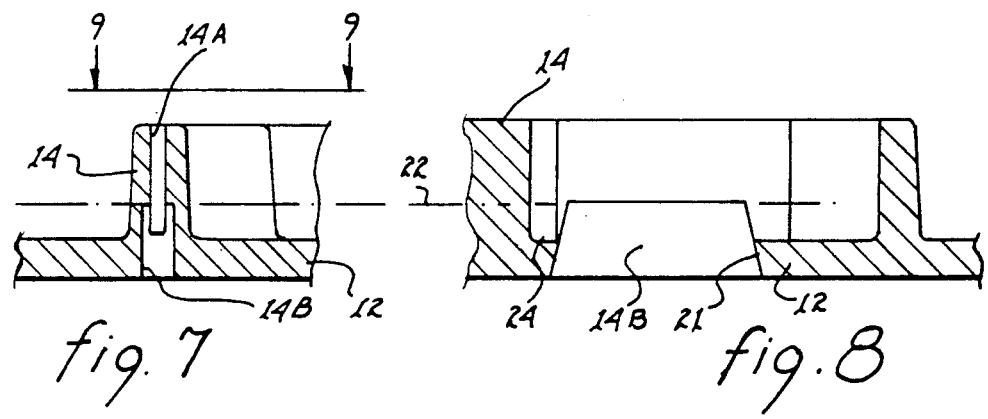
FIG. 7 is a cross sectional view of a mounting receptacle of FIG. 6 taken from 7—7 of FIG. 6.
FIG. 8 is a cross sectional view of a mounting receptacle of FIG. 6 taken from 8—8 of FIG. 6.

FIG. 7 is a cross sectional view taken from 7—7 of FIG. 6 showing the internal detail of mounting receptacle 14. Upper portion of slot opening 14A may preferably have a minimum dimension 0.006 inch wider than the thickness of tab 10C (not shown, but see FIG. 3) of upright member 10. Lower slot portion 14B may preferably be on the order of 0.080 inch wider than upper slot 14A, as measured at the upper end of slot 14B. This provides a 0.040 inch relief below upper slot 14A for clearance for bump 10B, which has a horizontal dimension of 0.025 inches. Preferably, upper slot 14A has little or no draft while lower slot 14B may have a draft of about 2 degrees to facilitate removal from an injection mold. These dimensions provide for good locking and unlocking characteristics with respect to upright member 10 tabs 10C, bumps 10B and mounting receptacles 14 considering the resilience of the plastic H.D.P.E. material suggested here.

FIG. 8 is a cross sectional view of mounting receptacle 14 taken from 8—8 of FIG. 6. Reference numeral 20 is an outline of the lower end of upper slot 14A, as may be seen from reference line 22 which extends into both FIGS. 7 and 8. The shelves at reference numerals 24 limit the downward extension of upright member 10 (not shown) when it is inserted into mounting receptacles 14.

FIG. 9 is a top view of mounting receptacle 14 taken from 9—9 of FIG. 7. The detail of shelves 24 is more clearly shown.

In use, upright member 10 is plugged into base member 12 to form a "zig-zag" vertical member. Hinges 18 of vertical member 10 are bent to conform vertical member 10 to the placement of mounting receptacles 14 on base 12. The assembly of the invention is placed in the vehicle; in the trunk of a passenger vehicle, in the rear of a station wagon or van type vehicle or in the bed of a pickup truck. Filled grocery bags 16 are placed on base member 12 with loop handles 16A looped about the upper protruding portions 10A of vertical member 10. In the preferred embodiment of the invention, having dimensions listed, above, it is estimated that ten or twelve such grocery bags may be accommodated. Upper loop handle supports 10A prevent grocery bags 16 from tipping over during transportation and provide an operator with instant and ready access to the loop handles of the grocery bags upon arrival at the destination point.

Once bags 16 are removed from the assembly of the invention, upright portion 10 may be easily removed from base member 12 and the two members 10 and 12 may be laid flat in the vehicle or easily moved out of the vehicle to a suitable storage location, ready for reassembly and further use.

While the invention has been particularly shown and described herein with reference to a preferred embodiment thereof, it will be understood by those skilled in the art that various other modifications and changes may be made to the present invention from the principles of the invention as herein described without departing from the spirit and scope as encompassed in the accompanying claims. For example, it may be advantageous to provide at least a portion of the upright and base members with lightening holes to reduce the weight of the assembly and to reduce the amount of plastic materials necessary in the fabrication of the assembly commensurate with stability and stiffness requirements of the assembly. Various other methods of releaseably attaching the upright member to the base member are also contemplated. Therefore, it is intended in the appended claims to cover all such equivalent variations which may come within the scope of the invention as described.

What is claimed is:

1. A portable assembly for receiving and supporting a plurality of filled shopping bags each having a pair of flexible handles, said assembly comprising:
    (a) a base member for receiving and supporting said plurality of filled shopping bags;
    (b) a plurality of upright members detachably secured to said base member and extending substantially perpendicularly therefrom;
    (c) each of said upright members secured to an adjacent upright member to form an acute horizontal angle therebetween to stiffen said assembly; and
    (e) the upper portion of said upright members forming a plurality of shopping bag handle supporting ends each adapted to receive and retain all the flexible handles of a respective one of said filled shopping bags.

2. The combination set forth in claim 1 wherein said upright members are hinged about a vertical axis to adjacent upright members to permit said members to lie flat when said assembly is disassembled.

3. The combination set forth in claim 1 wherein the upper portions of said upright members form a plurality of shopping bag handle supporting ends each in a bowling pin shape to receive and retain all the handles of a respective one of said filled shopping bags.

4. The combination set forth in claim 2 wherein the upper portions of said upright members form a plurality of shopping bag handle supporting ends each in a bowling pin shape to receive and retain all the handles of a respective one of said filled shopping bags.

* * * * *